Nov. 22, 1927. 1,649,966
T. MARIOTTI
APPARATUS FOR INDICATING INTERNAL RELIEVES OF HOLLOW BODIES
Filed June 24, 1924 2 Sheets-Sheet 1
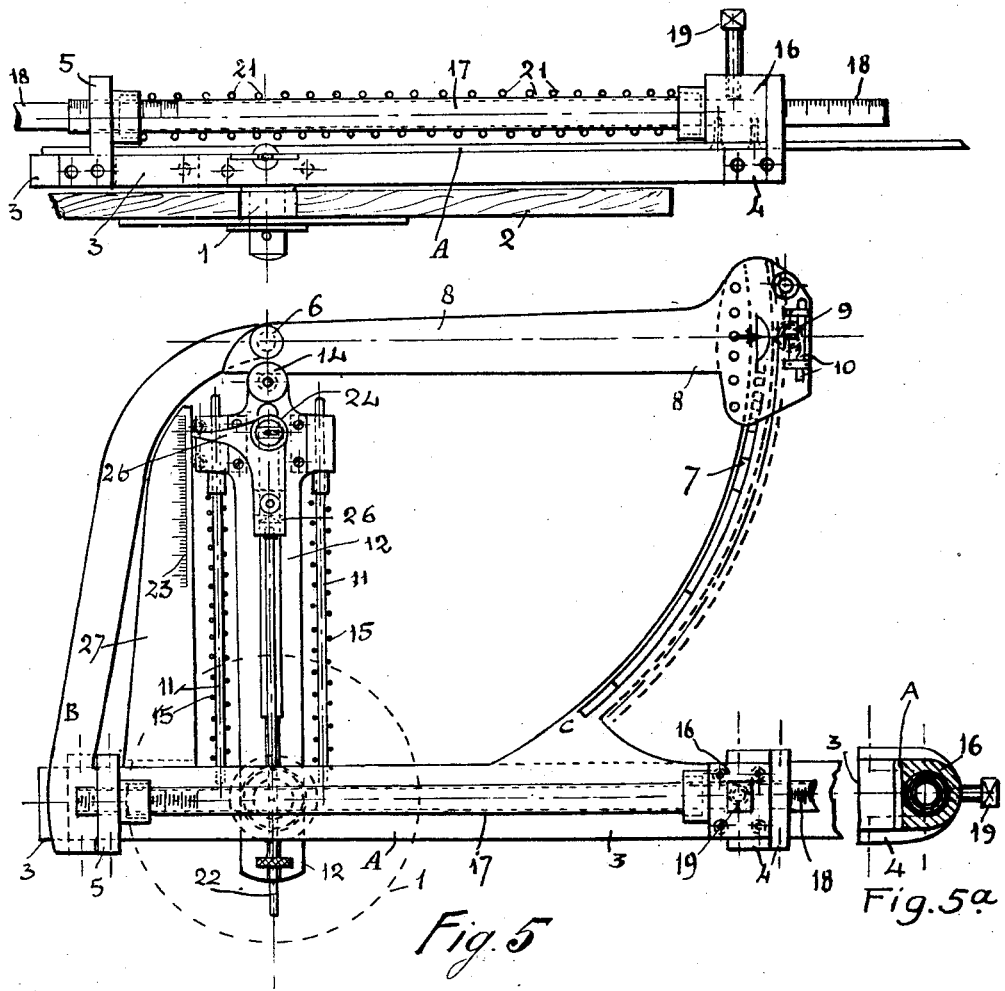

Nov. 22, 1927.
T. MARIOTTI
1,649,966
APPARATUS FOR INDICATING INTERNAL RELIEVES OF HOLLOW BODIES
Filed June 24, 1924
2 Sheets-Sheet 2
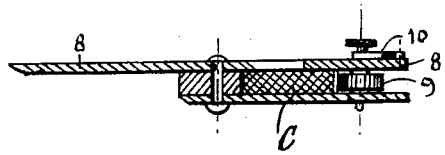
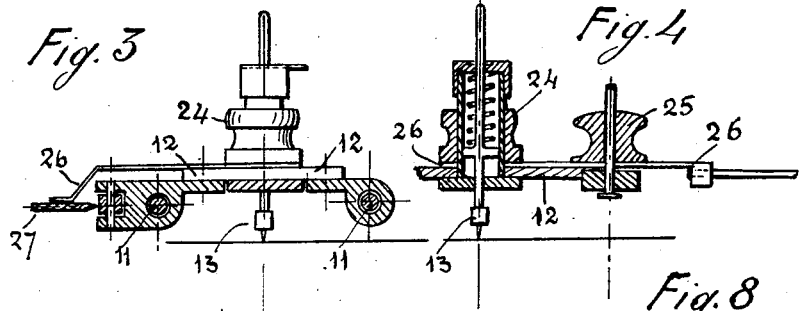
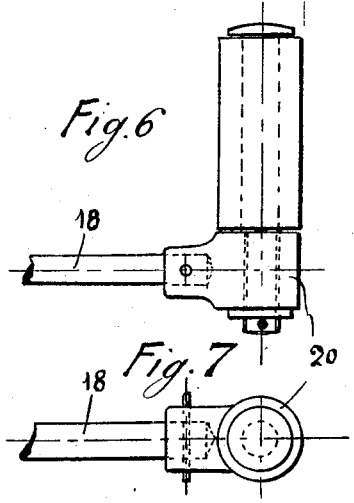
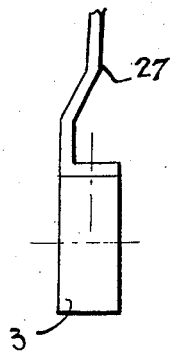
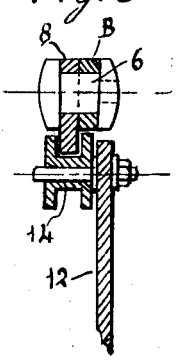
Inventor
Temistocle Mariotti
By B. Singer
Attorney Patented Nov. 22, 1927.

1,649,966

UNITED STATES PATENT OFFICE.

TEMISTOCLE MARIOTTI, OF GENOA, ITALY.

APPARATUS FOR INDICATING INTERNAL RELIEVES OF HOLLOW BODIES.

Application filed June 24, 1924, Serial No. 722,162, and in Italy March 27, 1924.

This invention relates to an improved apparatus for the measurement of the internal dimensions of the sections of hollow bodies which are substantially constituted by continuous curves, and is particularly adapted to measure the variations of the transverse sections of furnaces, cylinders, tanks or other cylindrical, conical or like shaped bodies.

For this purpose it is convenient to relieve a series of radial dimensions at several transverse sections of the body. The apparatus forming the subject matter of this invention is especially adapted for the said relieves, by means of which can be obtained either diagrams which constitute the reproduction at a suitable scale of the whole contour of the sections of the body, or the reproduction at a natural size of the variations of the internal radius referred to the correspondent radius of a basis circle at a reduced scale.

In some cases it is convenient to read directly by each measurement the length of the measured diameter, and this also is possible by using the improved apparatus of this invention.

The accompanying drawings show, though only by way of example, a practical application of this invention and particularly:

Fig. 1 shows a side view, partly in section, of the apparatus.

Fig. 2 shows in section some particulars of the arm which regulates the scale of the diagram.

Fig. 3 is a front view of the member bearing the index indicating the scale of the displacements of the pencil.

Fig. 4 is a section of the device for tracing the diagrams.

Fig. 5, shows a plan view of the apparatus, Fig. 5ª is a partial transverse section of the same.

Figs. 6 and 7 show respectively a side and a plan view of the contact roller.

Fig. 8 shows in transverse section the fulcrum of the rotating lever and the roller on which the said lever is leaning.

Fig. 9 is a side view of the lower end of the graduated plate indicating the position of the pencil.

The disk 1 bearing a board 2 to which a sheet of paper can be fixed, is fixedly secured by any known means in such a way that the plane of the disk falls substantially in the plane of the relief it is desired to determine. In the hole at the center of the disk is introduced the pivot on which the whole device, the disk with the frame and the board excepted, is arranged to rotate.

To the metallic bar 3 of rectangular section in a suitable position, a pivot is fixed in such a way, as to lie with its axis normal to the plane of the instrument, the said pivot having such dimensions as to fit conveniently in the central hole of the disk 1. To the end of this bar are fastened two bearing plates 4 and 5, each having a cylindrical hole through which another bar 18 is allowed to slide. The lower surfaces of these plates 4 and 5 do not contact with the correspondent surfaces of the bar 3 and between the said plates two little openings are disposed in which a little plate A can slide. The plate A is provided with two special projecting arms B and C, the former of which, shaped as it is shown in Fig. 5, has at its upper end a pivot 6 for the movable bar 8, while the arm C is substantially an arc of a circle, concentric with 6. The external edge of this arm C is suitably toothed to cooperate with the spur wheel 9, so that movable member 8 may assume every angular position from 0°, when the member 8 is parallel to the bar 3, to 45°.

On the arm C is inscribed a graduated scale showing the angular displacements of the member 8 and consequently the scale of the diagram, as will be explained hereafter. The wheel 9 is supported by a movable plate 10, by means of which the wheel can be disengaged from the toothed edge of the arm C, thus allowing the member 8 to be moved swiftly, whenever considerable displacements of the member 8 about 6 are required. The enlarged end of the member 8 can, by means of a clamping screw, be fastened to the arm C in the position corresponding to the desired scale of the diagram.

To the bar 3 are also fastened two guide rods 11 on which can slide a plate 12 provided at its upper end with a roller 14, Fig. 8, and having in its middle portion a long opening, in which runs a sliding member 13 holding the pencil to trace the diagram. Two cylindrical helical springs 15 about the rods 11 push the plate 12 in such a way, that the roller is constantly in contact with the inner edge of the member 8.

Upon the plate A, in a position very close to the bearing 4 when the system is in the condition as shown in Figs. 1 and 5, is fastened a bored piece 16 to which is welded a tube 17 extending towards the other end of the plate A and passing through the hole pierced in the bearing 5.

Within the tube 17 and the piece 16 runs a graduated bar 18 which can be tightened to the piece 16 and consequently to the plate A, by means of the clamping bolt 19 with which the piece 16 is provided. This bar 18 is extended on one of its sides (in the embodiment as shown in the annexed drawings, on the side of the bearing 4), by a suitable length and bears on the extended end a roller 20, Figs. 6 and 7, bearing against the inner surface of the hollow body, when the whole apparatus revolves about the pivot in disk 1.

A cylindrical helical spring, 21 of Fig. 1, and which is not represented on Fig. 5 to avoid confusion in the drawing, is interposed between the piece 16 and the bearing 5 and pushes constantly the bar 18 and consequently the roller 20 against the surface of the body.

The piece 26 holding the pencil, 13 in Figs. 3, 4 and 5, can slide into the opening of the member 12 driven by the threaded rod 22, which is operated by a round nut. The same piece 26 is shaped laterally like an index to show the displacements of the pencil 13, these displacements being read directly on the graduated scale engraved on the plate 27, which is fastened to the bar 3, Fig. 9, in such a way as to be able to bear also the transverse thrusts which the member 8 exercises, when inclined on the member 12 through the roller 14. To this purpose the member 12 leans on the adjacent edge of the plate 27, preferably on suitable rollers, as shown in Fig. 3. The piece 26 can be fastened to the member 12 by means of the clamping screw 25 and the pressure of the pencil on the paper can be regulated by a usual spring device 24 of Fig. 4.

When the member 8 is parallel to the axis of the bar 18, the displacements of this bar and consequently of the whole system A, B, C, cannot cause the member 12 to move, and thus the pencil 13 remaining at a constant distance from the central axis 1, by rotations of the instrument around the axis, will trace a circle on the paper applied to the board 2.

The radius of the circle is shown on the scale 23 in millimeters or inches and can be fixed at a convenient value by means of the regulating nut 22 to obtain the desired ratio with reference to the radius of the body stated as a basis of the measurements.

In these conditions, if the roller 20 runs along the contour of the section, the displacement of the bar 18 and of the whole movable system measures the differences between the internal radius of the body and the basis radius, but these differences are not marked on the paper. The operator can only read these differences on the graduation in millimeters or inches engraved on the bar 18 and inscribe them in the paper at the selected scale.

But, if the arm 8 is inclined, both directly and by means of the spur wheel 9, to reach a determined angle and locked in this position by the clamping screw, by every displacement of the bar 18 and consequently of the plate A, B, C and of the member 8 a proportional displacement of the sliding plate 12 and of the pencil which is fastened to the said plate will correspond, because the roller 14 by displacements along the inclined bar, will cause the pencil to move normally with reference to the bar A.

The ratio between the displacements of the bar 18 and of the pencil 13 depends upon the angle of the member 8 with the axis of the bar 3, this ratio varying from zero at 0° to one at 45° and having in any case the value of the trigonometrical tangent of this angle.

Consequently the angle of the member 8 states the scale in which the differences between the internal radius of the checked section and the basis radius are inscribed on the record paper.

The operation of the apparatus is as follows:

Having disposed the apparatus on the supporting frame within the cylindric hollow body, so as to let the board-bearing disc 1 lie in a plane parallel to that of the section to be checked, and with its center very near the center of the said section, the roller at the end of the bar 18 is brought into contact with the contour of the section, it being maintained thereagainst by pressure of the spring 21, also in the points more elongated from the axis of rotation of the instrument.

Then, having determined the corresponding mean radius of the basis circle of the diagram, the index of the member 26 is brought on the graduation 23 at a distance from the center, equal to the radius of the basis circle of the diagram, by operating the nut 22.

In order that the said basis circle should be traced upon the paper fixed on the board 2, it will be sufficient to arrange the bar 8 parallel to the axis of the bar 18 and rotate the instrument about its axis. In this rotation the movements of the bar 18, determined by the variations of the contour of the section are not transmitted to the pencil 13, as the member 8 moves parallel to the latter, on roller 14 without transmitting radial movements.

Having drawn the basis circle, the clamping screw 19 is loosened, thus permitting of a longitudinal sliding of the plate A with regard to the rod 18. By such movement, the pivot 6 is brought to exactly fall on the radial line being the path of movement of the pencil 13. The screw 19 is again screwed up, then the arm 8 is suitably inclined according to the desired scale of the diagram and thus the apparatus is ready for tracing the contour of the chosen section. This tracing may be effected in two ways, either at the same scale as the circle traced on the paper applied to the board 2, or at a different scale than the said circle, taking as a mean contour that of the said traced circle.

Should the same scale be adopted for tracing both the basis circle and the variations of the radii of the section of the body, the member 8 is inclined, by rotation about its pivot 6, till the outer end comes to that position on the scale 7, inscribed on the arc C, that gives the variations of the radii at the same scale as the basis circle. If, on the contrary, a scale is adopted for the variations of the basis circle, other than that of this latter, it will be sufficient to fix the arm 8 on the corresponding mark of the graduation 7. In this manner the arm 8 will be at such an angle, with respect to the bar 18, as to transform the movements of this latter in like radial displacements, but perpendicular to that effected by the roller 14 and pencil 13, and with the desired ratio.

Having now particularly described and ascertained the nature of my said invention and in what manner the same is to be performed. I declare that what I claim is:

1. Apparatus of the class described, comprising a base member arranged to be mounted on a support substantially in the plane of the section to be checked, a board on said base member for fixing a paper sheet, a bar pivotally mounted on said base member, a protractor having a base mounted for longitudinal movement on said base, said protractor element including a pivotally mounted pointer arm, a follower element mounted on said bar for longitudinal movement and arranged to bear at one end against the surface of the work, said follower element having a scale coacting with a member on said bar, a scale member arranged for longitudinal movement with said protractor and also with and independently of said scale follower member, means to secure said scale member and said follower member together in adjusted position, a scale arm projecting from said bar at right angles thereto, a plate slidably arranged with respect to said bar at right angles thereto and projecting therefrom on the same side as said scale arm and to a pivotal inner end of said protractor pointer arm and slidably engaged therewith for movement thereby, a spring active to maintain engagement between said plate and said protractor arm, a stylus carried by and movable with said plate, a pointer member with said stylus and cooperating with the scale of said scale arm, a connecting element between the stylus, the last named pointer and the said plate and including a scale and an adjusting element.

2. An instrument as in claim 1, in which the protractor is provided with an arcuate element having teeth and the protractor arm is provided with an adjusting element including a gear engaging said teeth to move said arm and fix it to the stated angle.

3. An instrument as in claim 1, in which the follower element is a rod, said bar being provided with bearings for said rod, said scale member consisting of a tube between said bearings and through which said rod extends, a spring provided to project said rod and said protractor element has a block through which said rod passes and which is provided with a set screw for adjustably securing said rod thereto and hence also to the protractor member element.

In witness whereof I affix my signature.

TEMISTOCLE MARIOTTI.